(12) United States Patent
Li et al.

(10) Patent No.: US 8,385,453 B2
(45) Date of Patent: Feb. 26, 2013

(54) DATA PROCESSING METHOD AND BASE STATION FOR DOWNLINK TRANSMIT DIVERSITY

(75) Inventors: Anxin Li, Beijing (CN); Yuan Yan, Beijing (CN); Xinying Gao, Beijing (CN); Hidetoshi Kayama, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 334 days.

(21) Appl. No.: 12/833,881

(22) Filed: Jul. 9, 2010

(65) Prior Publication Data

US 2011/0013713 A1 Jan. 20, 2011

(30) Foreign Application Priority Data

Jul. 20, 2009 (CN) .......................... 2009 1 0152170

(51) Int. Cl.
*H04B 7/02* (2006.01)
*H04L 1/02* (2006.01)
(52) U.S. Cl. .................. 375/267; 375/299; 370/206
(58) Field of Classification Search .......... 375/259–260, 375/267, 295, 299; 370/203, 206, 210
See application file for complete search history.

(56) References Cited

U.S. PATENT DOCUMENTS

| 5,029,333 | A  | * | 7/1991  | Graves et al. | 370/490 |
| 2005/0007983 | A1 | * | 1/2005  | Lee et al.    | 370/334 |
| 2006/0039500 | A1 | * | 2/2006  | Yun et al.    | 375/299 |
| 2006/0088115 | A1 | * | 4/2006  | Chen et al.   | 375/260 |
| 2008/0253279 | A1 | * | 10/2008 | Ma et al.     | 370/206 |
| 2009/0041151 | A1 | * | 2/2009  | Khan et al.   | 375/267 |
| 2009/0067522 | A1 | * | 3/2009  | Kwak et al.   | 375/260 |
| 2010/0067512 | A1 | * | 3/2010  | Nam et al.    | 370/342 |
| 2010/0111065 | A1 | * | 5/2010  | Noh et al.    | 370/342 |
| 2011/0026618 | A1 | * | 2/2011  | Kent et al.   | 375/260 |

\* cited by examiner

*Primary Examiner* — Jean B Corrielus
(74) *Attorney, Agent, or Firm* — Blakely, Sokoloff, Taylor & Zafman LLP

(57) ABSTRACT

A data processing method and a base station for downlink transmit diversity are disclosed. One embodiment of the method comprises: obtaining data symbol groups formed by arranging a first type data symbol and a second type data symbol in an interval, wherein the first type data symbol is more important; determining a first antenna port pairing mode corresponding to a current slot; performing, for OFDM symbols including the reference signal in the current slot, an antenna port and subcarrier mapping on symbols in a transmit diversity matrix corresponding to the data symbol groups according to the first antenna port pairing mode, wherein a subcarrier in which a symbol related to the first type data symbol is located is nearer to a subcarrier in which a reference signal at the same antenna port is located; and performing an inverse fast fourier transform and a cyclic prefix insertion processing on symbols mapped to subcarriers and then mapping the time domain symbols to a physical antenna for transmission. According to embodiments of the invention, comparatively important symbols may obtain better protection.

24 Claims, 19 Drawing Sheets

Fig. 2a
(Prior Art)

| Symbol1 | | | | Symbol2 | | | |
|---|---|---|---|---|---|---|---|
| Tx0 | Tx1 | Tx2 | Tx3 | Tx0 | Tx1 | Tx2 | Tx3 |
| 0 | P3 | 0 | S3* | 0 | P3 | 0 | S3* |
| 0 | S3 | 0 | -P3* | 0 | S3 | 0 | -P3* |
| 0 | R1 | 0 | 0 | 0 | 0 | 0 | R3 |
| P2 | 0 | S2* | 0 | P2 | 0 | S2* | 0 |
| S2 | 0 | -P2* | 0 | S2 | 0 | -P2* | 0 |
| R0 | 0 | 0 | 0 | 0 | 0 | R2 | 0 |
| 0 | P1 | 0 | S1* | 0 | P1 | 0 | S1* |
| 0 | S1 | 0 | -P1* | 0 | S1 | 0 | -P1* |
| 0 | R1 | 0 | 0 | 0 | 0 | 0 | R3 |
| P0 | 0 | S0* | 0 | P0 | 0 | S0* | 0 |
| S0 | 0 | -P0* | 0 | S0 | 0 | -P0* | 0 |
| R0 | 0 | 0 | 0 | 0 | 0 | R2 | 0 |

Fig. 4
(Prior Art)

| Symbol1 | | | | Symbol2 | | | |
|---|---|---|---|---|---|---|---|
| Tx0 | Tx1 | Tx2 | Tx3 | Tx0 | Tx1 | Tx2 | Tx3 |
| 0 | P3 | S3* | 0 | 0 | P3 | S3* | 0 |
| 0 | S3 | -P3* | 0 | 0 | S3 | -P3* | 0 |
| 0 | R1 | 0 | 0 | 0 | 0 | 0 | R3 |
| P2 | 0 | 0 | S2* | P2 | 0 | 0 | S2* |
| S2 | 0 | 0 | -P2* | S2 | 0 | 0 | -P2* |
| R0 | 0 | 0 | 0 | 0 | 0 | R2 | 0 |
| 0 | P1 | S1* | 0 | 0 | P1 | S1* | 0 |
| 0 | S1 | -P1* | 0 | 0 | S1 | -P1* | 0 |
| 0 | R1 | 0 | 0 | 0 | 0 | 0 | R3 |
| P0 | 0 | 0 | S0* | P0 | 0 | 0 | S0* |
| S0 | 0 | 0 | -P0* | S0 | 0 | 0 | -P0* |
| R0 | 0 | 0 | 0 | 0 | 0 | R2 | 0 |

Fig. 6

|  |  |  |  |  |  |  |
|---|---|---|---|---|---|---|
|  |  |  |  |  |  |  |
| R1 | R3 | R5 | R7 | R0 | R4 |  |
|  |  |  |  |  |  |  |
|  |  |  |  |  |  |  |
| R0 | R2 | R4 | R6 | R1 | R5 |  |
|  |  |  |  |  |  |  |
|  |  |  |  |  |  |  |
| R1 | R3 | R5 | R7 | R0 | R4 |  |
|  |  |  |  |  |  |  |
|  |  |  |  |  |  |  |
| R0 | R2 | R4 | R6 | R1 | R5 |  |

Fig. 7a

| | | | | | | |
|---|---|---|---|---|---|---|
| R1 | R2 | R5 | R6 | R0 | R4 | |
| | | | | | | |
| | | | | | | |
| R0 | R3 | R4 | R7 | R1 | R5 | |
| | | | | | | |
| | | | | | | |
| R1 | R2 | R5 | R6 | R0 | R4 | |
| | | | | | | |
| | | | | | | |
| R0 | R3 | R4 | R7 | R1 | R5 | |

Fig. 7b $$\begin{pmatrix} x0 & -x1* & 0 & 0 & 0 & 0 & 0 & 0 \\ x1 & x0* & 0 & 0 & 0 & 0 & 0 & 0 \\ 0 & 0 & x2 & -x3* & 0 & 0 & 0 & 0 \\ 0 & 0 & x3 & x2* & 0 & 0 & 0 & 0 \\ 0 & 0 & 0 & 0 & x4 & -x5* & 0 & 0 \\ 0 & 0 & 0 & 0 & x5 & x4 & 0 & 0 \\ 0 & 0 & 0 & 0 & 0 & 0 & x6 & -x7* \\ 0 & 0 & 0 & 0 & 0 & 0 & x7 & x6 \end{pmatrix}$$

Fig. 8

| Tx0 | Tx1 | Tx2 | Tx3 | Tx4 | Tx5 | Tx6 | Tx7 |
|---|---|---|---|---|---|---|---|
|   |   |   |   |   | P3 | S3* |   |
|   |   |   |   |   | S3 | -P3* |   |
| R0 | R1 |   | R3 | R4 | R5 |   | R7 |
|   |   |   |   | P2 |   |   | S2* |
|   |   |   |   | S2 |   |   | -P2* |
| R0 | R1 | R2 |   | R4 | R5 | R6 |   |
|   | P1 | S1* |   |   |   |   |   |
|   | S1 | -P1* |   |   |   |   |   |
| R0 | R1 |   | R3 | R4 | R5 |   | R7 |
| P0 |   |   | S0* |   |   |   |   |
| S0 |   |   | -P0* |   |   |   |   |
| R0 | R1 | R2 | 0 | R4 | R5 | R6 |   |

Fig. 9

| Tx0 | Tx1 | Tx2 | Tx3 | Tx4 | Tx5 | Tx6 | Tx7 |
|-----|-----|-----|-----|-----|-----|-----|-----|
|     |     |     |     |     | P3  |     | S3* |
|     |     |     |     |     | S3  |     | -P3* |
| R0  | R1  | R2  |     | R4  | R5  | R6  |     |
|     |     |     |     | P2  |     | S2* |     |
|     |     |     |     | S2  |     | -P2* |    |
| R0  | R1  |     | R3  | R4  | R5  |     | R7  |
|     | P1  |     | S1* |     |     |     |     |
|     | S1  |     | -P1* |    |     |     |     |
| R0  | R1  | R2  | 0   | R4  | R5  | R6  |     |
| P0  |     | S0* |     |     |     |     |     |
| S0  |     | -P0* |    |     |     |     |     |
| R0  | R1  |     | R3  | R4  | R5  |     | R7  |

Fig. 10

| | OFDM symbols not including RSs | | | |
|---|---|---|---|---|
| | Tx0 | Tx1 | Tx2 | Tx3 |
| | | P1 | S1* | |
| | | S1 | -P1* | |
| R0, R1, R3 | P0 | | | S0* |
| | S0 | | | -P0* |
| | | P3 | S3* | |
| R0, R1, R2 | | S3 | -P3* | |
| | P2 | | | S2* |
| | S2 | | | -P2* |
| R0, R1, R3 | | P1 | S1* | |
| | | S1 | -P1* | |
| | P0 | | | S0* |
| R0, R1, R2 | S0 | | | -P0* |

| | OFDM symbols not including RSs | | | |
|---|---|---|---|---|
| | Tx0 | Tx1 | Tx2 | Tx3 |
| | | P1 | S1* | |
| | | S1 | -P1* | |
| R0, R1, R3 | P0 | | | S0* |
| | S0 | | | -P0* |
| | | S3 | -P3* | |
| R0, R1, R2 | | P3 | S3* | |
| | S2 | | | -P2* |
| | P2 | | | S2* |
| R0, R1, R3 | P0 | | | S0* |
| | S0 | | | -P0* |
| | | P1 | S1* | |
| R0, R1, R2 | | S1 | -P1* | |

Fig. 11

| | OFDM symbols not including RSs | | | |
|---|---|---|---|---|
| | Tx0 | Tx1 | Tx2 | Tx3 |
| | | P1 | | S1* |
| | | S1 | | -P1* |
| R0, R1, R2 | P0 | | S0* | |
| | S0 | | -P0* | |
| | | P3 | | S3* |
| R0, R1, R3 | | S3 | | -P3* |
| | P2 | | S2* | |
| | S2 | | -P2* | |
| R0, R1, R2 | | P1 | | S1* |
| | | S1 | | -P1* |
| | P0 | | S0* | |
| R0, R1, R3 | S0 | | -P0* | |

| | OFDM symbols not including RSs | | | |
|---|---|---|---|---|
| | Tx0 | Tx1 | Tx2 | Tx3 |
| | | P1 | | S1* |
| | | S1 | | -P1* |
| R0, R1, R2 | P0 | | S0* | |
| | S0 | | -P0* | |
| | | S3 | | -P3* |
| R0, R1, R3 | | P3 | | S3* |
| | S2 | | -P2* | |
| | P2 | | S2* | |
| R0, R1, R2 | P0 | | S0* | |
| | S0 | | -P0* | |
| | | P1 | | S1* |
| R0, R1, R3 | | S1 | | -P1* |

Fig. 12

DATA PROCESSING METHOD AND BASE STATION FOR DOWNLINK TRANSMIT DIVERSITY

PRIORITY

The present application claims priority to and incorporates by reference the entire contents of Chinese patent application No. 200910152170.0, filed in China on Jul. 20, 2009.

BACKGROUND OF THE INVENTION

1. Field of the Invention

Embodiments of the present invention relates to antenna port pairing and subcarrier mapping, and more particularly to a method and a system for antenna port pairing and subcarrier mapping for downlink transmit diversity, which provide better protection for important modulation symbols and improve the reliability of transmission.

2. Description of the Prior Art

Transmit Diversity (TxD) is a very important multi-input and multi-output (MIMO) transmission mode, especially for user equipments (UE) with high mobility and low Signal to Interference plus Noise Ratio (SINR).

Generally, a communication system needs to adopt channel coding to check and correct errors so as to improve the reliability of the data transmission. For output of the channel encoder, different bits have different levels of importance. For example, the systematic bit generally has higher importance while the parity bit generally has lower importance.

The downlink transmit diversity in 3GPP Long Term Evolution (LTE) adopts a scheme combining the Space-Frequency Block Code (SFBC) and Frequency Switch Transmit Diversity (FSTD), whose coding matrix is shown in FIG. 1.

As shown in FIG. 1, a fixed antenna port pairing is adopted in this scheme, in which antenna port 0 and antenna port 2 are paired to transmit one SFBC block, and antenna port 1 and antenna port 3 are paired to transmit one SFBC block.

The reason why LTE adopts fixed antenna port pairing is that the densities of the Reference Signals (RS) corresponding to the antenna ports are different.

FIGS. 2a, 2b, 2c and 2d are schematic diagrams showing distributions of RSs of antenna ports 0, 1, 2, 3 respectively.

The reason why LTE adopts this kind of antenna port pairing mode (one high density RS antenna port together with a low density RS antenna port) is to achieve the performance of balance between two SFBC blocks, i.e. to protect the two SFBC blocks in a same way.

The structure of the LTE transmit diversity transmitter is shown in FIG. 3. The data symbols output by the modulator include two parts: systematic symbol S; and parity symbol P.

The systematic symbol is more important than the parity symbol.

However, since frequency domain distances from different subcarriers to subcarriers in which RSs are located are different, different subcarriers have different reliabilities. Generally, the smaller the frequency domain distance from the subcarrier to the subcarrier in which the RS are located, the higher the reliability of the subcarrier is.

However, according to the LTE transmit scheme different reliabilities between subcarriers are not taken into account and the importance of data symbols is not differentiated when the antenna port pairing and subcarrier mapping is performed. Therefore, important data symbols may be mapped to low reliable subcarriers and thus optimal performance cannot be obtained.

For the single antenna system, there is an improved subcarrier mapping scheme to solve the above problems, which maps comparatively important data symbols to subcarriers which have comparatively small frequency domain distances with the subcarrier in which the RS is located. However, this method is not suitable for multi-antenna transmit diversity scheme. Examples are given below.

FIG. 4 is a schematic diagram showing a distribution after the symbols in the transmit diversity coding matrix are mapped to the corresponding antenna ports and subcarriers according to the fixed antenna port pairing in a 4-antenna system. As shown in FIG. 4, R0, R1, R2 and R3 are reference signals on antenna ports 0, 1, 2 and 3 respectively. Since antenna ports 0 and 2 are a fixed pair and antenna ports 1 and 3 are a fixed pair, taking into account of the arrangement of the RSs at the antenna ports in slot 1, in slot 1, after the symbols are mapped to antenna ports and subcarriers, as shown in FIG. 4, if the systematic symbol S0 is mapped to the position nearest to the RS R0 at the antenna port 0, the systematic symbol S0* cannot be mapped to the position nearest to the RS R2 at the antenna port 2 because of the characteristic of the space frequency code. On the contrary, the parity symbol −P0* is mapped to the position nearest to the RS R2, i.e., −P0* is better protected than S0*, which will lead to the loss of the system performance. Similarly, −P1*/−P2*/−P3* is better protected than S1*/S2*/S3*.

Of course, the above is only a kind of subcarrier mapping mode. However, as long as the antenna ports are paired fixedly, there will be the above problem and in other multi-antenna systems, there are similar problems.

SUMMARY OF THE INVENTION

An aspect of embodiments of the present invention is to provide a method and a base station for antenna port pairing and subcarrier mapping for downlink transmit diversity, which provide better protection for important modulation symbols and reduce system performance loss.

In order to achieve the above aspect, an embodiment of the present invention provides a data processing method for downlink transmit diversity, comprising:

a sequencing and grouping operation, for sequencing and grouping data symbols in a first data symbol sequence output by a modulator and for obtaining a second data symbol sequence, wherein the second data symbol sequence includes a third data symbol sequence, which is comprised by data symbol groups and in each of the data symbol groups, a first type data symbol and a second type data symbol are arranged in intervals and the first type data symbol are more important than the second type data symbol;

an antenna port pairing operation, for determining a first antenna port pairing mode corresponding to a current slot according to a distribution of a reference signal at the first antenna port in the current slot;

a first mapping processing operation, for performing, for Orthogonal Frequency Division Multiplex symbols including RSs in the current slot by utilizing a frequency switching diversity technology, an antenna port and subcarrier mapping on symbols in a transmit diversity matrix corresponding to the data symbol groups according to the first antenna port pairing mode, wherein among two symbols mapped to a same antenna port, a subcarrier in which a symbol related to the first type data symbol is located is nearer to a subcarrier in which a reference signal at the same antenna port is located; and a transmission processing operation, for performing an inverse fast fourier transform and a cyclic prefix insertion processing on symbols mapped to subcarriers and then for mapping the time domain symbols to a physical antenna for transmission.

According to the above data processing method, for a 4-antenna system, when the current slot is slot 1, the first antenna pairing mode is: antenna port 0 and antenna port 3 are a pair, and antenna port 1 and antenna port 2 are a pair; and when the current slot is slot 2, the first antenna pairing mode is: antenna port 0 and antenna port 2 are a pair, and antenna port 1 and antenna port 3 are a pair.

According to the above data processing method, for an 8-antenna system, when the current slot is slot 1, the first antenna pairing mode is: antenna port 0 and antenna port 3 are a pair, antenna port 1 and antenna port 2 are a pair, antenna port 4 and antenna port 7 are a pair and antenna port 5 and antenna port 6 are a pair; and when the current slot is slot 2, the first antenna pairing mode is: antenna port 0 and antenna port 2 are a pair, antenna port 1 and antenna port 3 are a pair, antenna port 4 and antenna port 6 are a pair and antenna port 5 and antenna port 7 are a pair.

According to the above data processing method, the method further comprises:

a second mapping processing operation, for performing, for Orthogonal Frequency Division Multiplex symbols not including RSs in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which RSs at corresponding antenna ports are located is minimum.

According to the above data processing method, in the second mapping processing step, the sum of frequency domain distances from subcarriers in which symbols related to the first type data symbol are located to subcarriers in which RSs at corresponding antenna ports are located is made minimum by adjusting a sequence of space frequency block code blocks in the transmit diversity matrix corresponding to the data symbol groups or by adjusting a sequence of symbols in a same space frequency block code block.

According to the above data processing method, the first type data symbol and the second type data symbol are a systematic symbol and a parity symbol respectively.

In order to achieve the above aspect, an embodiment of the present invention provides a base station for downlink transmit diversity, comprising a modulator and wherein the base station further comprises:

a sequencing and grouping module, for sequencing and grouping data symbols in a first data symbol sequence output by the modulator and for obtaining a second data symbol sequence, wherein the second data symbol sequence includes a third data symbol sequence, which is comprised by data symbol groups and in each of the data symbol groups, a first type data symbol and a second type data symbol are arranged in intervals and the first type data symbol are more important than the second type data symbol;

an antenna port pairing module, for determining a first antenna port pairing mode corresponding to a current slot according to a distribution of a reference signal at the first antenna port in the current slot;

a first mapping processing module, for performing, for Orthogonal Frequency Division Multiplex symbols including RSs in the current slot by utilizing a frequency switching diversity technology, an antenna port and subcarrier mapping on symbols in a transmit diversity matrix corresponding to the data symbol groups according to the first antenna port pairing mode, wherein among two symbols mapped to a same antenna port, a subcarrier in which a symbol related to the first type data symbol is located is nearer to a subcarrier in which a reference signal at the same antenna port is located; and a transmission processing module, for performing an inverse fast fourier transform and a cyclic prefix insertion processing on symbols mapped to subcarriers and then for mapping the time domain symbols to a physical antenna for transmission.

According to the above base station, for a 4-antenna system, when the current slot is slot 1, the first antenna pairing mode is: antenna port 0 and antenna port 3 are a pair, and antenna port 1 and antenna port 2 are a pair; and when the current slot is slot 2, the first antenna pairing mode is: antenna port 0 and antenna port 2 are a pair, and antenna port 1 and antenna port 3 are a pair.

According to the above base station, for an 8-antenna system, when the current slot is slot 1, the first antenna pairing mode is: antenna port 0 and antenna port 3 are a pair, antenna port 1 and antenna port 2 are a pair, antenna port 4 and antenna port 7 are a pair and antenna port 5 and antenna port 6 are a pair; and when the current slot is slot 2, the first antenna pairing mode is: antenna port 0 and antenna port 2 are a pair, antenna port 1 and antenna port 3 are a pair, antenna port 4 and antenna port 6 are a pair and antenna port 5 and antenna port 7 are a pair.

According to the above base station, the base station further comprises:

a second mapping processing module, for performing, for Orthogonal Frequency Division Multiplex symbols not including RSs in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which RSs at corresponding antenna ports are located is minimum.

According to the above base station, in the second mapping processing module, the sum of frequency domain distances from subcarriers in which symbols related to the first type data symbol are located to subcarriers in which RSs at corresponding antenna ports are located is made minimum by adjusting a sequence of space frequency block code blocks in the transmit diversity matrix corresponding to the data symbol groups or by adjusting a sequence of symbols in a same space frequency block code block.

According to the above base station, the first type data symbol and the second type data symbol are a systematic symbol and a parity symbol respectively.

Embodiments of the present invention have the following advantages.

In one embodiment of the present invention, data symbols in a first data symbol sequence including the first type data symbol and the second type data symbol output by the modulator are sequenced and grouped and a second data symbol sequence is obtained. The second data symbol sequence includes at least one data symbol group, and in the data symbol group, the first type data symbol and the second type data symbol are arranged in an interval so that it is possible to allocate all important symbols to high reliable subcarriers. Then the first antenna port pairing mode corresponding to the current slot is determined according to the distribution of RSs in the current slot, wherein, in the current slot, after the antenna port and subcarrier mapping is performed on the symbols in the transmit diversity matrix corresponding to the data symbol group according to the first antenna port pairing mode, among two symbols mapped to a same antenna port, a subcarrier in which a symbol related to the first type data symbol is located is nearer to a subcarrier in which a reference signal at the same antenna port is located. Therefore, the first type data symbol obtains better protection and the system performance loss is reduced.

Further, for OFDM symbols not including RSs in the current slot, the antenna port and subcarrier mapping is performed on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which RSs at corresponding antenna ports are located is minimum. Therefore, the first type data symbol obtains further protection.

BRIEF DESCRIPTION OF THE DRAWINGS

FIG. 2*a* to FIG. 2*d* are schematic diagrams showing distributions of RSs at antenna ports 1-4 respectively in a 4-antenna system;

FIG. 4 is a schematic diagram showing a distribution after symbols in a transmit diversity coding matrix are mapped to antenna ports and subcarriers when a fixed antenna port pairing mode is adopted in a 4-antenna system;

FIG. 6 is a schematic diagram showing a distribution after symbols in a transmit diversity coding matrix are mapped to antenna ports and subcarriers when a fixed antenna port pairing mode is adopted in a 4-antenna system;

FIGS. 7*a*-7*b* are schematic diagrams showing distributions of RSs at antenna ports in an 8-antenna system in slot 1 and slot 2 respectively;

FIG. 8 is a schematic diagram showing a LTE transmit diversity coding matrix in the 8-antenna system;

FIG. 9 is a schematic diagram showing a distribution after symbols in the transmit diversity coding matrix are mapped to antenna ports and subcarriers when the antenna port pairing mode according to an embodiment of the present invention is adopted in slot 1 in the 8-antenna system;

FIG. 10 is a schematic diagram showing a distribution after symbols in the transmit diversity coding matrix are mapped to antenna ports and subcarriers when the antenna port pairing mode according to an embodiment of the present invention is adopted in slot 2 in the 8-antenna system;

FIG. 11 is a schematic diagram showing a symbol distribution in a first slot after the antenna port and subcarrier mapping is performed on symbols in a former transmit diversity matrix and in a new transmit diversity matrix by using a first antenna port pairing mode;

FIG. 12 is a schematic diagram showing a symbol distribution in a first slot after the antenna port and subcarrier mapping is performed on symbols in a former transmit diversity matrix and in a new transmit diversity matrix by using a first antenna port pairing mode.

DETAILED DESCRIPTION OF THE PREFERRED EMBODIMENTS

According to an embodiment of the present invention, first type symbols and second type symbols are tried to be arranged in intervals by resequencing data symbols output by the modulator and important data symbols are mapped to subcarriers with higher reliabilities (near to RSs) by performing dynamic antenna port pairing and subcarrier mapping, wherein the first type symbols are more important than the second type symbols.

Figure 5:
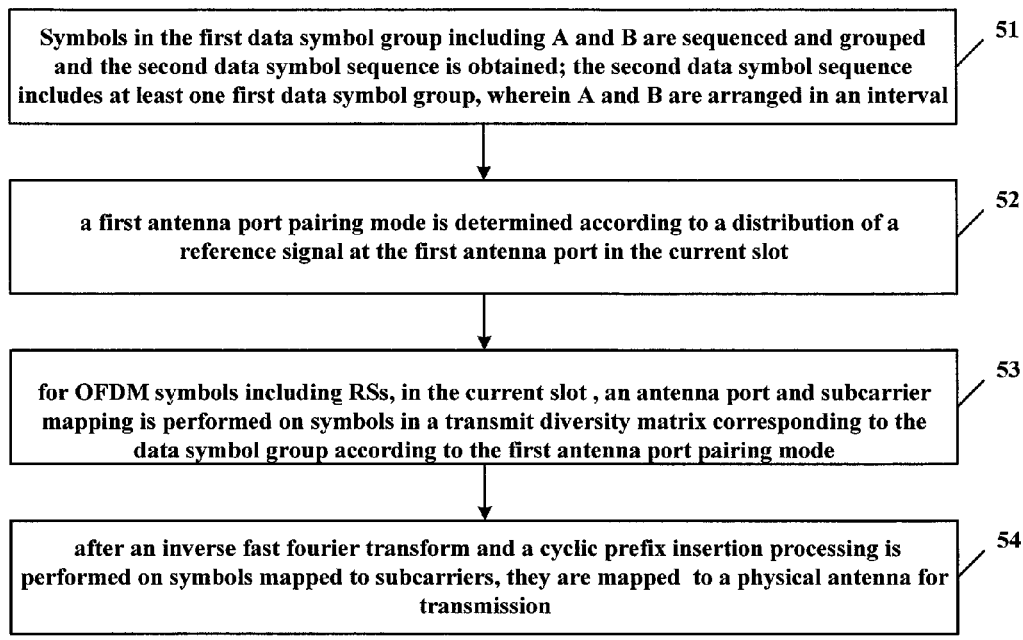
FIG. 5 is a flow chart showing a data processing method for downlink transmit diversity according to an embodiment of the present invention.

As shown in FIG. 5, a data processing method for downlink transmit diversity according to the first embodiment of the present invention includes the following steps.

In sequencing and grouping step 51, data symbols in a first data symbol sequence including a first type data symbol (named as A for simplicity) and a second type data symbol (named as B for simplicity) output by the modulator are sequenced and grouped and a second data symbol sequence is obtained. The second data symbol sequence includes a third data symbol sequence, which is comprised by data symbol groups and in each of the data symbol groups, the first type data symbol and the second type data symbol are arranged in an interval. From another aspect, the second data symbol sequence includes at least one data symbol group in which A and B are arranged in an interval. An importance of a symbol related to A (including A itself) is higher than that of a symbol related with B.

Of course, in order to improve the reliability of transmission as high as possible, the second data symbol sequence should include data symbol groups as many as possible.

In the first data symbol sequence output by the modulator, the number of A equals to that of B and all the data symbol groups in the second data symbol sequence may be arranged in ABAB mode.

In this case, the second data symbol sequence is the same as the third data symbol sequence.

In the first data symbol sequence output by the modulator, when the number of A is larger than that of B, the remaining As are arranged in AAAA mode and other data symbol groups are arranged in ABAB mode.

In this case, the third data symbol sequence is part of the second data symbol sequence.

In the first data symbol sequence output by the modulator, when the number of B is larger than that of A, the remaining Bs are arranged in BBBB mode and other data symbol groups are arranged in ABAB mode.

In this case, the third data symbol sequence is part of the second data symbol sequence.

An example will be given in which the number of B is larger than that of A.

Assuming the first symbol sequence is AAAAAAAAAABBBBBBBBBBBBBB, the second data symbol sequence will be ABABABABABABABABA-BABBBBBB and the third data symbol sequence will be ABA-BABABABABABABABAB, in which the data symbol group is ABAB.

According to the LTE in prior art, the importance of modulated output symbols is not differentiated. If the data symbols input to the space time code matrix are all important data symbols (systematic symbol S), taking into account of the characteristic of SFBC, some important data symbols must be allocated to low reliable subcarriers, which will reduce the transmission reliability.

Since subcarriers occupied by the transmit diversity coding matrix always include high reliable subcarriers and low reliable subcarriers, in the above step 51, the important data symbols and unimportant data symbols are arranged in intervals so that such a resequenced group may be sufficiently adapt to the characteristic of the transmit coding matrix and all important data symbols can be allocated to high reliable subcarriers.

In antenna port pairing step 52, the first antenna port pairing mode corresponding to the current slot is determined according to a distribution of the RS at the antenna port in the current slot.

The first antenna port pairing mode has the following characteristics.

In the current slot, after the antenna port and subcarrier mapping is performed on the symbols in the transmit diversity matrix corresponding to the data symbol group according to the first antenna port pairing mode, among the two symbols mapped to the same antenna port, the subcarrier in which the symbol related to A (including A itself and A* or −A*, wherein the symbol of A is decided by the position of A in the data symbol group) is located is nearer to the subcarrier in which the RS at the same antenna port is located.

It can be understood as the following from the point of frequency difference.

The absolute value of the central frequency difference between the subcarrier in which the symbol related to A is located and the subcarrier in which the RS at the same antenna port is located is less than the absolute value of the central frequency difference between the subcarrier in which the symbol related to B is located and the subcarrier in which the RS at the same antenna port is located.

Briefly speaking, the symbols mapped to the same antenna port is A (assuming mapped to subcarrier a) and B (assuming mapped to subcarrier b), or A* (assuming mapped to subcarrier c) and −B* (assuming mapped to subcarrier d). After the antenna port and subcarrier mapping is performed on the symbols in the transmit diversity matrix corresponding to the data symbol group according to the first antenna port pairing mode, subcarrier a is nearer to the subcarrier in which the RS at the antenna port where A is at is located than subcarrier b and at the same time, subcarrier c is nearer to the subcarrier in which the RS at the antenna port where A* is at is located than subcarrier d.

In a first mapping processing step 53, for OFDM symbols including RSs, the antenna port and subcarrier mapping is performed on the symbols in the transmit diversity matrix corresponding to the data symbol group according to the first antenna port pairing mode in the current slot by utilizing frequency switching diversity technology.

In the case the antenna port pairing is determined, the antenna port and subcarrier mapping processing is performed according to the conventional antenna port and subcarrier mapping processing method.

In a transmit processing step 54, after the symbols mapped to the subcarriers are subjected to the inverse fast fourier transform and cyclic prefix insertion processing, they are mapped to the physical antenna for transmission.

The subcarrier mapping scheme has been regulated in related standards of LTE and it will be described in detail with reference to step 53 here.

In one data symbol group of A1B1A2B2, the symbols in the corresponding transmit diversity matrix include A1, B1, A2, B2, A1*, −B1*, A2*, −B2*.

After A1, B1, A2 and B2 are mapped to the corresponding antenna ports and subcarriers, once the antenna port pairing is determined, A1*, −B1*, A2* and −B2* are determined correspondingly, wherein −B1* is mapped to the subcarrier in which A1 is located, A1* is mapped to the subcarrier in which B1 is located, −B2* is mapped to the subcarrier in which A2 is located, and A2* is mapped to the subcarrier in which B2 is located.

In the detailed embodiment of the present invention, one antenna port a is selected for A1 and B1 (assuming that the RS at antenna port a is located in subcarrier 3) first and A1 and B1 are mapped to the subcarrier 1 and subcarrier 2, wherein the frequency domain distance between subcarrier 1 and subcarrier 3 is less than that between subcarrier 2 and subcarrier 3. According to the antenna port pairing mode corresponding to the current slot, assuming antenna port a and antenna port b (assuming RS at antenna port b is in subcarrier 4) are a pair, A1* and −B1* will be mapped to antenna port b and subcarriers 2 and 1, wherein the frequency domain distance between subcarrier 2 and subcarrier 4 is less than that between subcarrier 1 and subcarrier 4.

It has been mentioned in the background that for antenna ports in which the distributions of the RSs change according to the slots, it cannot be guaranteed that important symbols can be well protected in all slots according to the fixed antenna port pairing mode in the prior art. Taking an example of 4-antenna system, the method according to the embodiment of the present invention can solve the above problem.

In the embodiment of the present invention, in step 52, the antenna port pairing mode corresponding to the current slot needs to be determined according to the distribution mode of RS at the antenna port in the current slot. Since according to the prior art, slot 1 cannot not protect important symbols well, then slot 1 will be taken as an example to illustrate.

Figure 1:
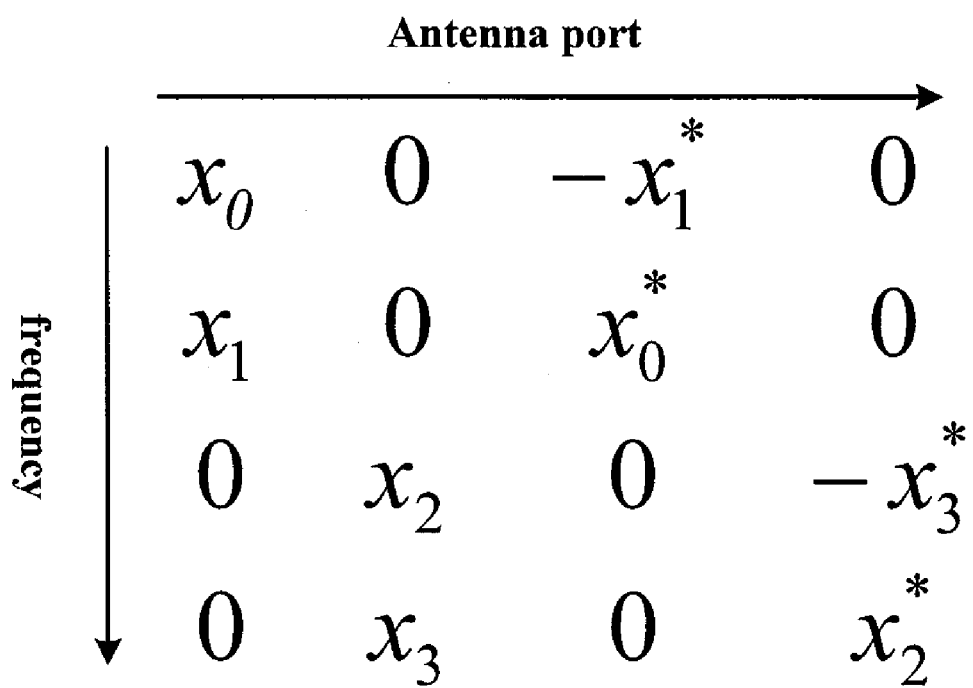
FIG. 1 is a schematic diagram showing a LTE transmit diversity coding matrix when a fixed antenna port pairing is adopted.
Figure 2A:
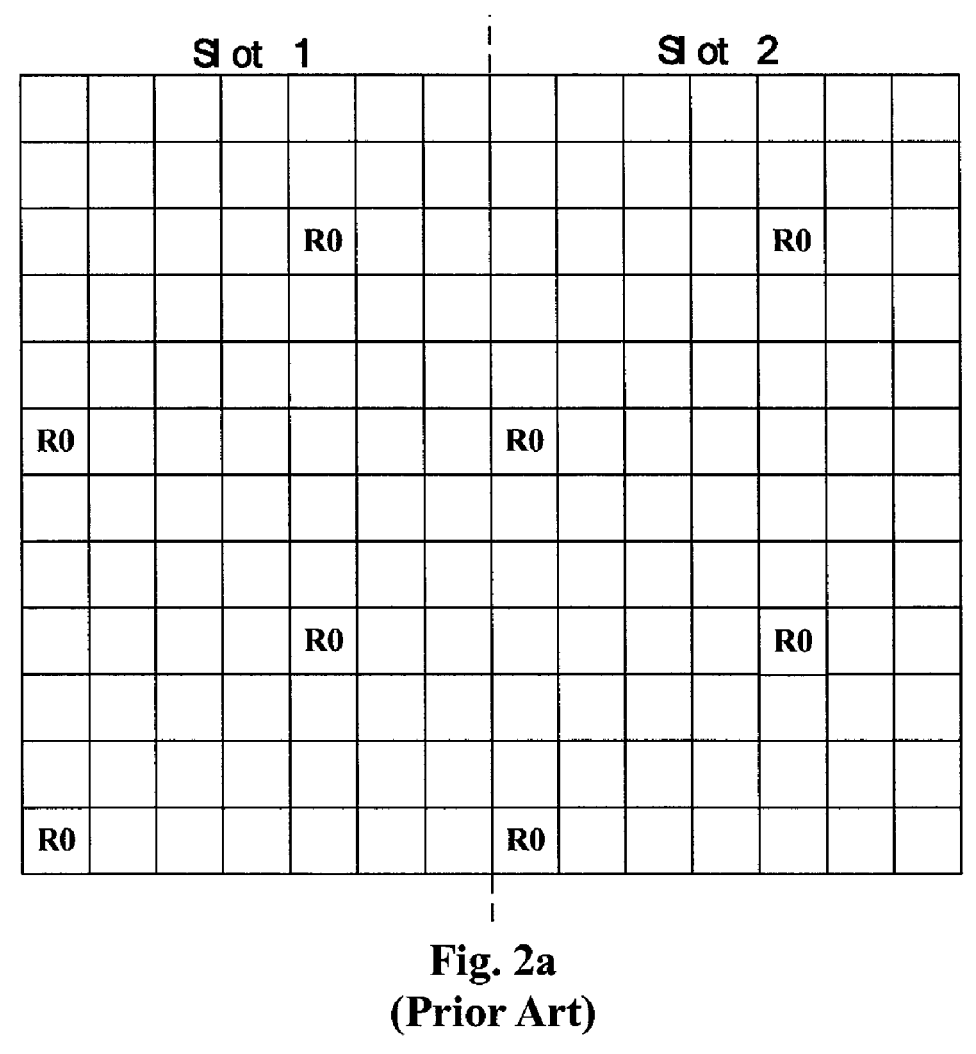
Figure 2B:
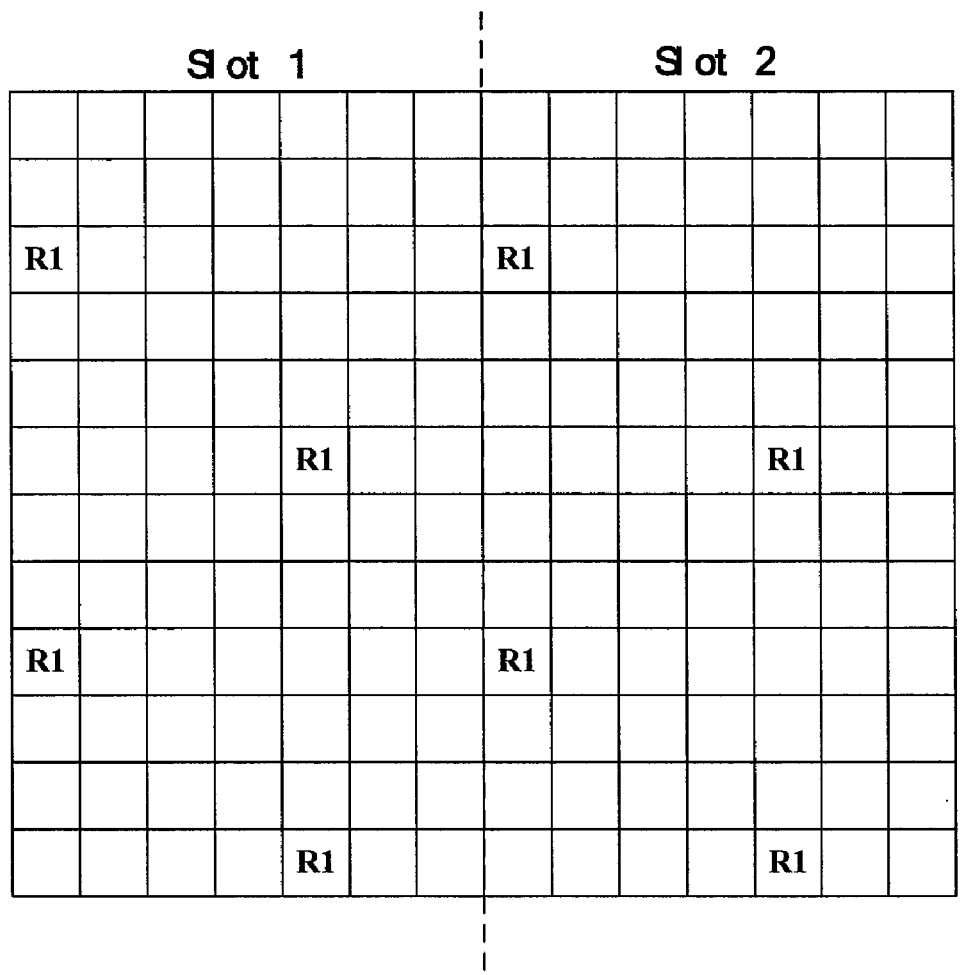
Figure 2C:
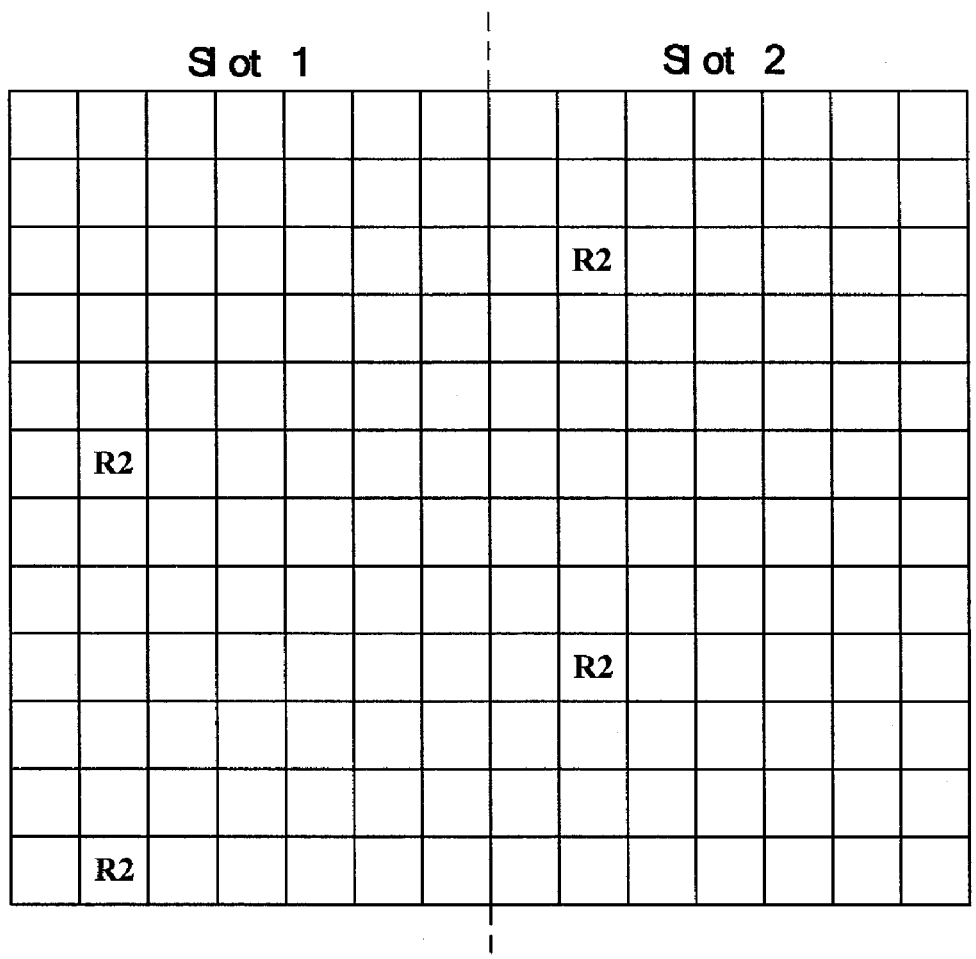
Figure 2D:
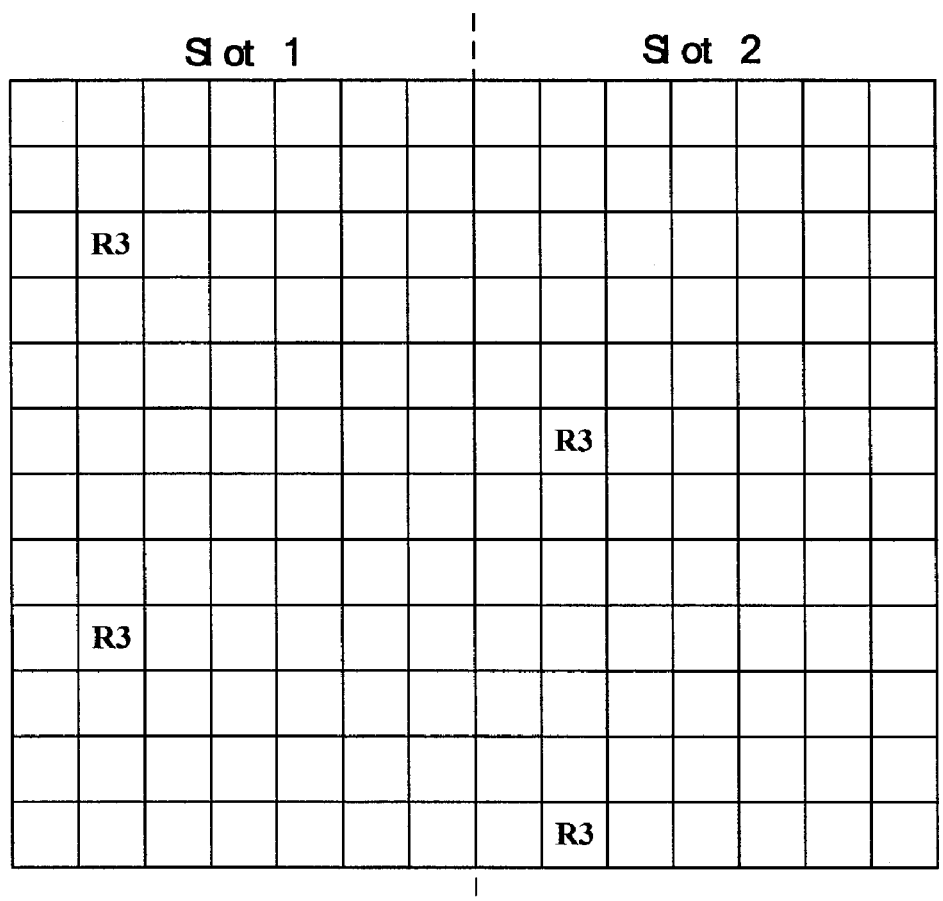
Figure 3:
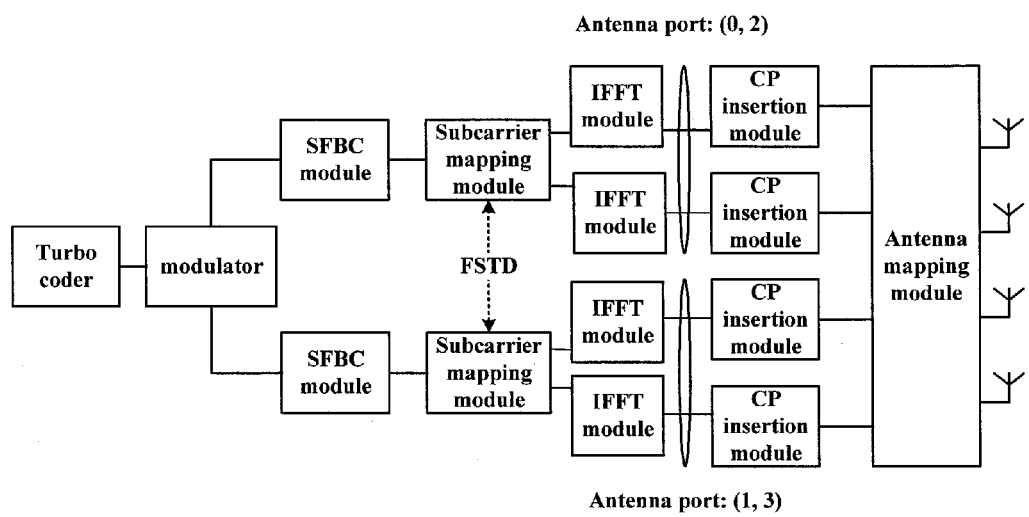
FIG. 3 is a schematic diagram showing a structure of an LTE transmit diversity transmitter.

In the 4-antenna system, the distributions of RSs are shown in FIG. 2a to FIG. 2d. FIG. 2c and FIG. 2d show that the RSs at antenna port 2 and antenna port 3 are not symmetrically distributed, i.e. the distributions of RSs at antenna port 2 and antenna port 3 in slot 1 are different from those in slot 2. Therefore, according to the above differences, in the embodiment of the present invention, for slot 1, antenna port 0 and antenna port 3 are a pair, and antenna port 1 and antenna port 2 are a pair. According to this pairing mode, in slot 1, after symbols are mapped to the antenna ports and subcarriers, as shown in FIG. 6, S0 is mapped to antenna port 0 and the subcarrier in which S0 is located is adjacent to the subcarrier in which R0 at antenna port 0 is located. Therefore, S0 can obtain best protection. S0* is mapped to antenna port 3 and the subcarrier in which S3 is located is adjacent to the subcarrier in which R3 at antenna port 3 is located. Therefore, S0* can obtain best protection also. Therefore, symbols S0 and S0* related to the systematic bit on the same SFBC both obtain best protection. FIG. 6 shows that in slot 1, symbols (S0, S0*, S1, S1*, S2, S2*, S3, S3*) related to the systematic bit also obtain best protection.

Similarly, in slot 2, antenna port 0 and antenna port 2 are a pair and antenna port 1 and antenna port 3 are a pair. In this pairing mode, symbols (S0, S0*, S1, S1*, S2, S2*, S3, S3*) related to the systematic bit also obtain best protection.

Therefore, compared with the prior art, important modulation symbols obtain better protection and thus system performance loss is reduced.

Taking 8-antenna system as an example, the embodiment of the present invention will be further described in the following.

In the 8-antenna system, the distributions of RSs are shown in FIG. 7a and FIG. 7b and the diversity coding matrix is shown in FIG. 8.

In the embodiment of the present invention, for slot 1, antenna port 0 and antenna port 2 are a pair, and antenna port 4 and antenna port 7 are a pair, and antenna port 5 and antenna port 6 are a pair. According to this pairing mode, in slot 1, after symbols are mapped to the antenna ports and subcarriers, as shown in FIG. 9, S0 is mapped to antenna port 0 and the subcarrier in which S0 is located is adjacent to the subcarrier in which R0 at antenna port 0 is located. Therefore, S0 can obtain best protection. S0* is mapped to antenna port 3 and the subcarrier in which S3 is located is adjacent to the subcarrier in which R3 at antenna port 3 is located. Therefore, S0* can obtain best protection also. Therefore, symbols S0 and S0* related to the systematic bit on the same SFBC both obtain best protection. FIG. 9 shows that in slot 1, symbols (S0, S0*, S1, S1*, S2, S2*, S3, S3*) related to the systematic bit also obtain best protection.

Similarly, in slot 2, antenna port 0 and antenna port 2 are a pair and antenna port 1 and antenna port 3 are a pair and antenna port 4 and antenna port 6 are a pair. In this pairing mode, in slot 1, after symbols are mapped to antenna ports and subcarriers, as shown in FIG. 10, symbols (S0, S0*, S1, S1*, S2, S2*, S3, S3*) related to the systematic bit also obtain best protection.

Therefore, compared with the prior art, important modulation symbols obtain better protection and thus system performance loss is reduced.

Of course, it should be understood that for systems with other number of antennas, the embodiment of the present invention can also be applied and will not be described here one by one.

After the above processing, among OFDM symbols including RSs, systematic symbols can obtain best protection. However, among OFDM symbols not including RSs, the above port pairing mode can also be applied. In order to better protect comparatively important symbols in the transmit diversity matrix corresponding to the data symbol group, for OFDM symbols not including RSs, the following step is further included.

In a second mapping processing step, for OFDM symbols not including RSs, in the current slot, the antenna port and subcarrier mapping is performed on the symbols in the transmit diversity matrix corresponding to the data symbol group according to the first antenna port pairing mode, wherein after the antenna port and subcarrier mapping is performed on the symbols in the new transmit diversity matrix according to the first antenna port pairing mode, the sum of frequency domain distances from the subcarriers in which comparatively important symbols are located to the subcarriers in which RSs at the corresponding antenna ports are located is minimum.

Taking the 4-antenna system as an example to illustrate.

The table on the left of FIG. 11 is a schematic diagram showing a symbol distribution in a first slot after the antenna port and subcarrier mapping is performed on symbols in a former transmit diversity matrix and in a new transmit diversity matrix by using a first antenna port pairing mode. Data symbol groups S0P0S1P1 and S2P2S3P3 are taken as examples to illustrate.

As shown in the table on the left of FIG. 11, S0 is mapped to Tx0 and the distance R0 is 0; S0* is mapped to Tx3 and the distance R3 is 1; S1 is mapped to Tx1 and the distance R1 is 1; S1* is mapped to Tx2 and the distance R2 is 3; therefore, the distance sum is 0+2+1+3=6.

According to the method of the embodiment of the present invention, the sequence of different SFBCs in the transmit diversity matrix corresponding to the data symbol group S0P0S1P1 is adjusted first and then the antenna port and subcarrier mapping is performed and the symbol distribution shown in the table on the right of FIG. 11 is obtained, wherein S0 is mapped to Tx0 and the distance R0 is 1; S0* is mapped to Tx3 and the distance R3 is 0; S1 is mapped to Tx1 and the distance R1 is 0; S1* is mapped to Tx2 and the distance R2 is 1; therefore, the distance sum is 1+0+0+1=2.

The data symbol group S2P2S3P3 is taken as an example to illustrate.

As shown in the table on the left of FIG. 11, S2 is mapped to Tx0 and the distance R0 is 1; S2* is mapped to Tx3 and the distance R3 is 2; S3 is mapped to Tx1 and the distance R1 is 0; S3* is mapped to Tx2 and the distance R2 is 1; therefore, the distance sum is 1+2+0+1=4.

According to the method of the embodiment of the present invention, the sequence of systematic symbol (S) and parity symbol (P) in the same SFBC in the transmit diversity matrix corresponding to the data symbol group S2P2S3P3 is adjusted first and then the antenna port and subcarrier mapping is performed and the symbol distribution shown in the table on the right of FIG. 11 is obtained, wherein S2 is mapped to Tx0 and the distance R0 is 1; S2* is mapped to Tx3 and the distance R3 is 1; S3 is mapped to Tx1 and the distance R1 is 1; S3* is mapped to Tx2 and the distance R2 is 0; therefore, the distance sum is 1+1+1+0=3.

Generally speaking, since the sum of the frequency domain distances from the subcarriers in which comparatively important symbols are located to the subcarriers in which RSs at the corresponding antenna ports are located is minimum, comparatively important symbols obtain better protection.

The table on the left of FIG. 12 is a schematic diagram showing a symbol distribution in a second slot after the antenna port and subcarrier mapping is performed on symbols in a former transmit diversity matrix and in a new transmit diversity matrix by using a first antenna port pairing mode. Data symbol groups S0P0S1P1 and S2P2S3P3 are taken as examples to illustrate.

As shown in the table on the left of FIG. 11, S0 is mapped to Tx0 and the distance R0 is 0; S0* is mapped to Tx2 and the distance R2 is 1; S1 is mapped to Tx1 and the distance R1 is 1; S1* is mapped to Tx3 and the distance R3 is 3; therefore, the distance sum is 0+2+1+3=6.

According to the method of the embodiment of the present invention, the sequence of different SFBCs in the transmit diversity matrix corresponding to the data symbol group S0P0S1P1 is adjusted first and then the antenna port and subcarrier mapping is performed and the symbol distribution shown in the table on the right of FIG. 12 is obtained, wherein S0 is mapped to Tx0 and the distance R0 is 1; S0* is mapped to Tx2 and the distance R2 is 0; S1 is mapped to Tx1 and the distance R1 is 0; S1* is mapped to Tx3 and the distance R3 is 1; therefore, the distance sum is 1+0+0+1=2.

The data symbol group S2P2S3P3 is taken as an example to illustrate.

As shown in the table on the left of FIG. 12, S2 is mapped to Tx0 and the distance R0 is 1; S2* is mapped to Tx2 and the distance R2 is 2; S3 is mapped to Tx1 and the distance R1 is 0; S3* is mapped to Tx3 and the distance R3 is 1; therefore, the distance sum is 1+2+0+1=4.

According to the method of the embodiment of the present invention, the sequence of systematic symbol (S) and parity symbol (P) in the same SFBC in the transmit diversity matrix corresponding to the data symbol group S2P2S3P3 is adjusted first and then the antenna port and subcarrier mapping is performed and the symbol distribution shown in the table on the right of FIG. 12 is obtained, wherein S2 is mapped to Tx0 and the distance R0 is 1; S2* is mapped to Tx2 and the distance R2 is 1; S3 is mapped to Tx1 and the distance R1 is 1; S3* is mapped to Tx3 and the distance R3 is 0; therefore, the distance sum is 1+1+1+0=3.

Generally speaking, since the sum of the frequency domain distances from the subcarriers in which comparatively important symbols are located to the subcarriers in which RSs at the corresponding antenna ports are located is minimum, comparatively important symbols obtain better protection.

Of course, it should be understood that for systems with other number of antennas, the above processing of OFDM symbols not including RSs can also be applied and will not be described here one by one.

Figure 16:
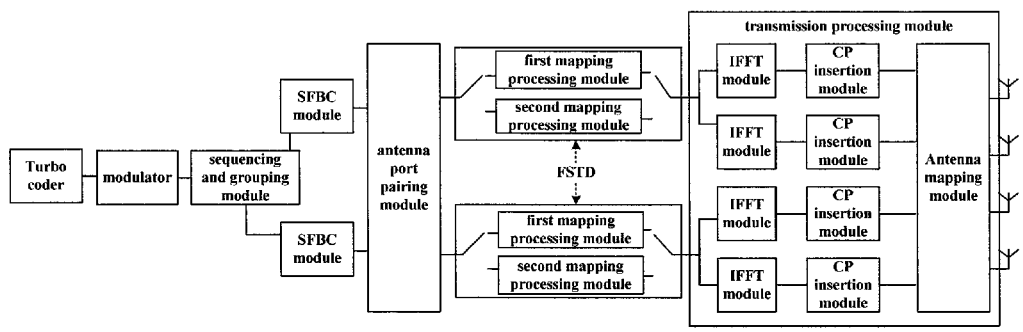
FIG. 16 is a schematic diagram showing a structure of a base station for downlink transmit diversity

The base station according to the embodiment of the present invention, and as illustrated in FIG. 16, includes a modulator, physical antennas, and a sequencing and grouping module is for sequencing and grouping data symbols in a first data symbol sequence including a first type data symbol (named as A for simplicity) and a second type data symbol (named as B for simplicity) output by the modulator and obtaining a second data symbol sequence; the second data symbol sequence includes a third data symbol sequence, which is comprised by data symbol groups and in each of the data symbol groups, the first type data symbol and the second type data symbol are arranged in an interval and from another aspect, the second data symbol sequence includes at least one data symbol group in which A and B are arranged in an interval; an importance of a symbol related to A (including A itself) is higher than that of a symbol related with B.

Of course, in order to improve the reliability of transmission as high as possible, the second data symbol sequence should include data symbol groups as many as possible.

In the first data symbol sequence output by the modulator, the number of A equals to that of B and all the data symbol groups in the second data symbol sequence may be arranged in ABAB mode.

In the first data symbol sequence output by the modulator, when the number of A is larger than that of B, the remaining As are arranged in AAAA mode and other data symbol groups are arranged in ABAB mode.

In the first data symbol sequence output by the modulator, when the number of B is larger than that of A, the remaining Bs are arranged in BBBB mode and other data symbol groups are arranged in ABAB mode.

According to the LTE in prior art, the importance of modulated output symbols is not differentiated. If the data symbols input to the space time code matrix are all important data symbols (systematic symbol S), taking into account of the characteristic of SFBC, some important data symbols must be allocated to low reliable subcarriers, which will reduce the transmission reliability.

Since subcarriers occupied by the transmit diversity coding matrix always include high reliable subcarriers and low reliable subcarriers, in the above sequencing and grouping module, the important data symbols and unimportant data symbols are arranged in intervals so that such a resequenced group may be sufficiently adapt to the characteristic of the transmit coding matrix and all important data symbols can be allocated to high reliable subcarriers.

An antenna port pairing module is for determining the first antenna port pairing mode corresponding to the current slot according to a distribution of the RS at the antenna port in the current slot.

The first antenna port pairing mode has the following characteristics.

In the current slot, after the antenna port and subcarrier mapping is performed on the symbols in the transmit diversity matrix corresponding to the data symbol group according to the first antenna port pairing mode, among the two symbols mapped to the same antenna port, the subcarrier in which the symbol related to A is located is nearer to the subcarrier in which the RS at the same antenna port is located.

It can be understood as the following from the point of frequency difference.

The absolute value of the central frequency difference between the subcarrier in which the symbol related to A is located and the subcarrier in which the RS at the same antenna port is located is less than the absolute value of the central frequency difference between the subcarrier in which the symbol related to B is located and the subcarrier in which the RS at the same antenna port is located.

Briefly speaking, the symbols mapped to the same antenna port is A (assuming mapped to subcarrier a) and B (assuming mapped to subcarrier b), or A* (assuming mapped to subcarrier c) and −B* (assuming mapped to subcarrier d). After the antenna port and subcarrier mapping is performed on the symbols in the transmit diversity matrix corresponding to the data symbol group according to the first antenna port pairing mode, subcarrier a is nearer to the subcarrier in which the RS at the antenna port where A is at is located than subcarrier b and at the same time, subcarrier c is nearer to the subcarrier in which the RS at the antenna port where A* is at is located than subcarrier d.

A first mapping processing module is for performing the antenna port and subcarrier mapping on the symbols in the transmit diversity matrix corresponding to the data symbol group according to the first antenna port pairing mode in the current slot by utilizing frequency switching diversity technology, for OFDM symbols including RSs.

In the case the antenna port pairing is determined, the antenna port and subcarrier mapping processing is performed according to the conventional antenna port and subcarrier mapping processing method.

A transmit processing module is for performing the inverse fast fourier transform and cyclic prefix insertion processing on the symbols mapped to the subcarriers and then mapping them to the physical antenna for transmission.

In order to better protect comparatively important symbols in the transmit diversity matrix corresponding to the data symbol group, the following module is further included.

A second mapping processing module is for performing the antenna port and subcarrier mapping on the symbols in the transmit diversity matrix corresponding to the data symbol group according to the first antenna port pairing mode for OFDM symbols not including RSs in the current slot by utilizing the frequency switching diversity technology, wherein after the antenna port and subcarrier mapping is performed on the symbols in the transmit diversity matrix according to the first antenna port pairing mode, the sum of frequency domain distances from the subcarriers in which comparatively important symbols are located to the subcarriers in which RSs at the corresponding antenna ports are located is minimum.

In order to prove the effectiveness of the embodiment of the present invention, the scheme proposed is simulated and compared with the conventional scheme. The simulation conditions are as follows.

Multi-antenna channel: uncorrelated TU6 channel.

Antenna configuration: 4 antennas for the base station and 4 antennas for the mobile station.

Channel estimation algorithm: minimum mean square error estimation and linear interpolation.

Frame structure and RS position: same as TS 36.211 and TS 36.212 standards.

User mobility speed: 120 km/h.

Figure 13:
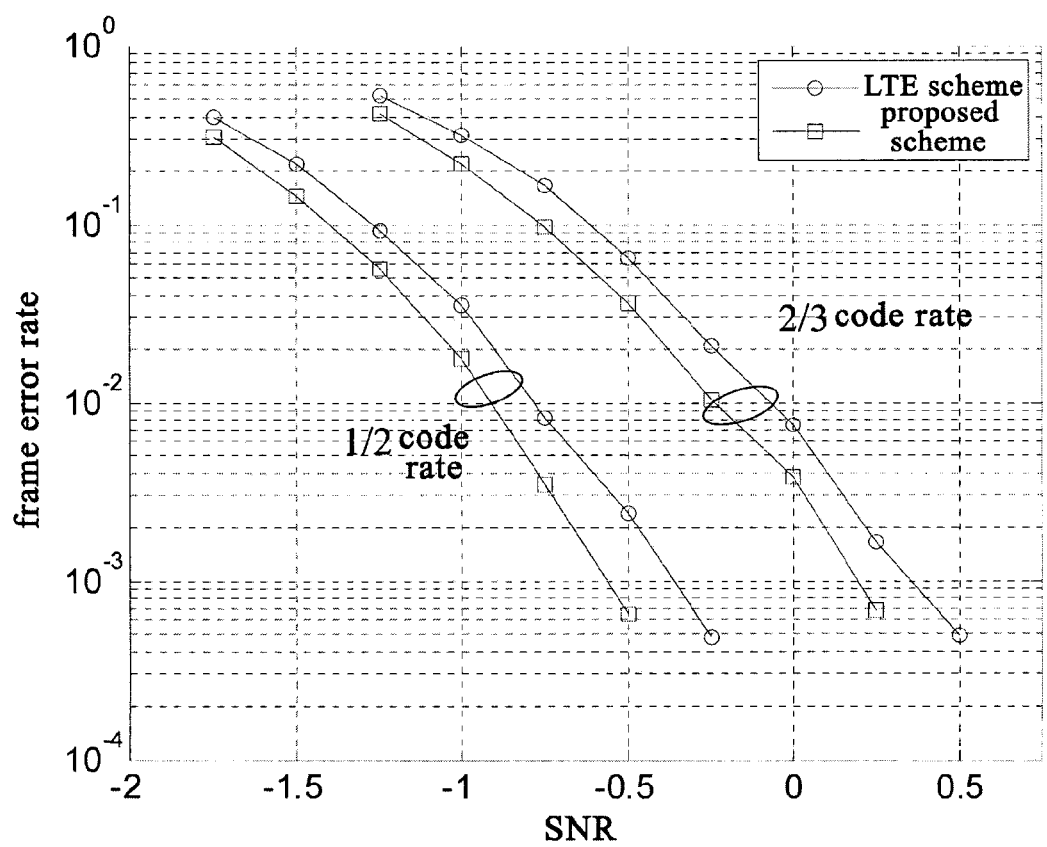
FIGS. 13-15 are simulation result diagrams using the method of an embodiment of the present invention.

FIG. 13 shows a frame error rate of turbo code in a case of QPSK modulation, 10 resource blocks and ½ or ⅔ code rates. FIG. 13 shows that the scheme of the embodiment can obtain lower frame error rate than the LTE scheme.

Figure 14:
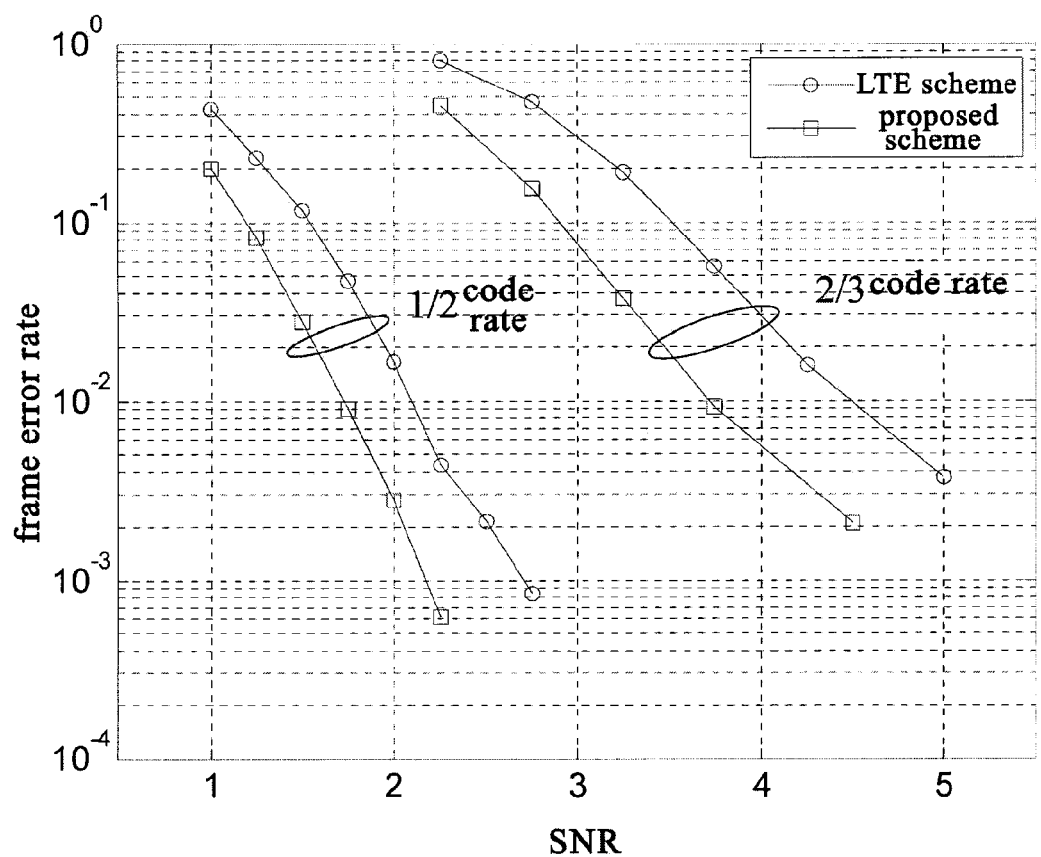

FIG. 14 shows a frame error rate of turbo code in a case of 16QAM modulation, 10 resource blocks and ½ or ⅔ code rates. FIG. 14 shows that in the case of high order modulation, the scheme of the embodiment can also obtain lower frame error rate than the LTE scheme.

Figure 15:
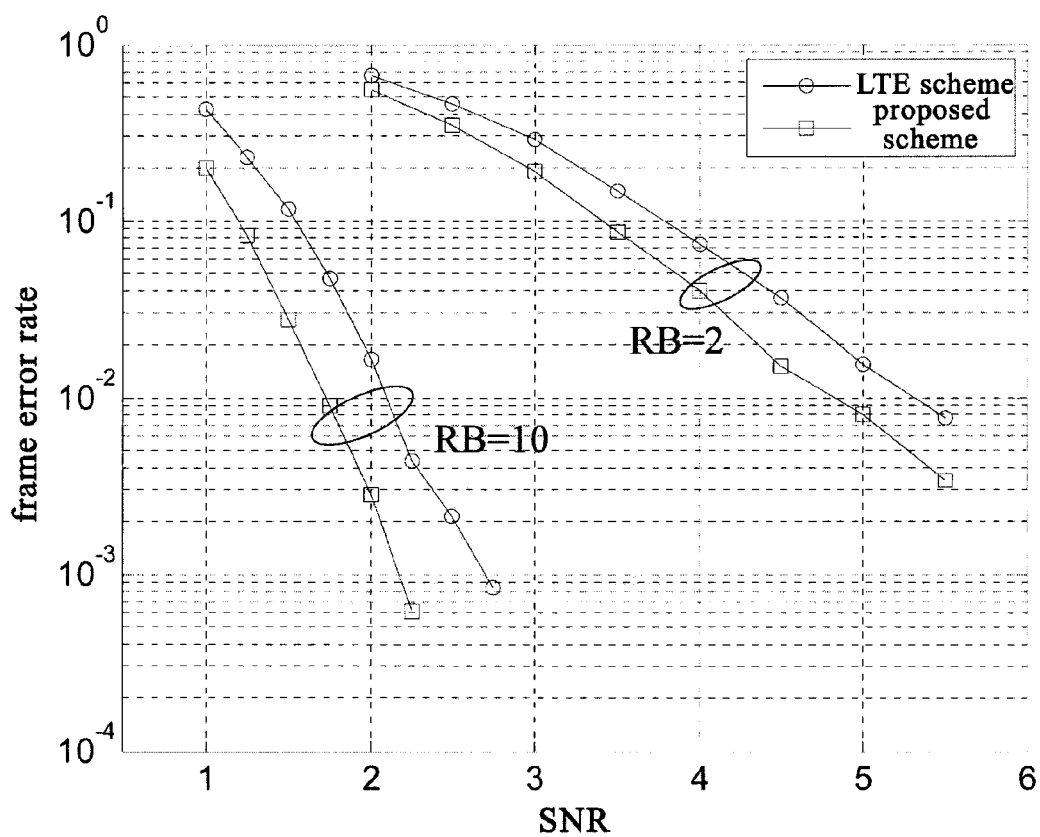

FIG. 15 shows a frame error rate of turbo code in a case of 16QAM modulation, 2 or 10 resource blocks and ½ code rate. FIG. 14 shows that in the case of fewer resource blocks, the scheme of the embodiment can also obtain lower frame error rate than the LTE scheme.

The above are only preferred embodiments of the present invention. It should be understood that for those skilled in the art, various improvements and modifications can be made without departing from the principle of the present invention and should be regarded as the protection scope of the present invention.

What is claimed is:

1. A data processing method for downlink transmit diversity, comprising:
    sequencing and grouping data symbols in a first data symbol sequence output by a modulator to obtain a second data symbol sequence, wherein the second data symbol sequence includes a third data symbol sequence, which is constructed by data symbol groups and in each of the data symbol groups, a first type data symbol and a second type data symbol are arranged in intervals and the first type data symbol have higher importance than the second type data symbol;
    determining a first antenna port pairing mode corresponding to a current slot according to a distribution of a reference signal at the first antenna port in the current slot;
    performing, for Orthogonal Frequency Division Multiplex symbols including the reference signal in the current slot by utilizing a frequency switching diversity technology, an antenna port and subcarrier mapping on symbols in a transmit diversity matrix corresponding to the data symbol groups according to the first antenna port pairing mode, wherein among two symbols mapped to a same antenna port, a subcarrier in which a symbol related to the first type data symbol is located is nearer to a subcarrier in which a reference signal at the same antenna port is located; and
    performing an inverse fast fourier transform and a cyclic prefix insertion processing on symbols mapped to subcarriers and then mapping the time domain symbols to a physical antenna for transmission.

2. The data processing method according to claim 1, wherein,
    for a 4-antenna system, when the current slot is slot 1, the first antenna pairing mode is: antenna port 0 and antenna port 3 are a pair, and antenna port 1 and antenna port 2 are a pair; and when the current slot is slot 2, the first antenna pairing mode is: antenna port 0 and antenna port 2 are a pair, and antenna port 1 and antenna port 3 are a pair.

3. The data processing method according to claim 1, wherein, for an 8-antenna system, when the current slot is slot 1, the first antenna pairing mode is: antenna port 0 and antenna port 3 are a pair, antenna port 1 and antenna port 2 are a pair, antenna port 4 and antenna port 7 are a pair and antenna port 5 and antenna port 6 are a pair; and when the current slot is slot 2, the first antenna pairing mode is: antenna port 0 and antenna port 2 are a pair, antenna port 1 and antenna port 3 are a pair, antenna port 4 and antenna port 6 are a pair and antenna port 5 and antenna port 7 are a pair.

4. The data processing method according to claim 1, further comprising:
    a second mapping processing step, for performing, for Orthogonal Frequency Division Multiplex symbols not including the reference signal in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which the reference signal at corresponding antenna ports are located is minimum.

5. The data processing method according to claim 2, further comprising:
    a second mapping processing step, for performing, for Orthogonal Frequency Division Multiplex symbols not including the reference signal in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which the reference signal at corresponding antenna ports are located is minimum.

6. The data processing method according to claim 3, further comprising:
    a second mapping processing step, for performing, for Orthogonal Frequency Division Multiplex symbols not including the reference signal in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which the reference signal at corresponding antenna ports are located is minimum.

7. The data processing method according to claim 4, wherein
    in the second mapping processing step, the sum of frequency domain distances from subcarriers in which symbols related to the first type data symbol are located to subcarriers in which the reference signal at corresponding antenna ports are located is made minimum by adjusting a sequence of space frequency block code blocks in the transmit diversity matrix corresponding to the data symbol groups or by adjusting a sequence of symbols in a same space frequency block code block.

8. The data processing method according to claim 5, wherein in the second mapping processing step, the sum of frequency domain distances from subcarriers in which symbols related to the first type data symbol are located to subcarriers in which the reference signal at corresponding antenna ports are located is made minimum by adjusting a sequence of space frequency block code blocks in the transmit diversity matrix corresponding to the data symbol groups or by adjusting a sequence of symbols in a same space frequency block code block.

9. The data processing method according to claim 6, wherein
in the second mapping processing step, the sum of frequency domain distances from subcarriers in which symbols related to the first type data symbol are located to subcarriers in which the reference signal at corresponding antenna ports are located is made minimum by adjusting a sequence of space frequency block code blocks in the transmit diversity matrix corresponding to the data symbol groups or by adjusting a sequence of symbols in a same space frequency block code block.

10. The data processing method according to claim 7, wherein
the first type data symbol and the second type data symbol are a systematic symbol and a parity symbol respectively.

11. The data processing method according to claim 8, wherein
the first type data symbol and the second type data symbol are a systematic symbol and a parity symbol respectively.

12. The data processing method according to claim 9, wherein
the first type data symbol and the second type data symbol are a systematic symbol and a parity symbol respectively.

13. A base station for downlink transmit diversity, comprising
a modulator;
a sequencing and grouping module, to sequence and grouping data symbols in a first data symbol sequence output by the modulator to obtain a second data symbol sequence, wherein the second data symbol sequence includes a third data symbol sequence, which is constructed by data symbol groups and in each of the data symbol groups, a first type data symbol and a second type data symbol are arranged in intervals and the first type data symbol have higher importance than the second type data symbol;
an antenna port pairing module, to determine a first antenna port pairing mode corresponding to a current slot according to a distribution of a reference signal at the first antenna port in the current slot;
a first mapping processing module, to perform, for Orthogonal Frequency Division Multiplex symbols including the reference signal in the current slot by utilizing a frequency switching diversity technology, an antenna port and subcarrier mapping on symbols in a transmit diversity matrix corresponding to the data symbol groups according to the first antenna port pairing mode, wherein among two symbols mapped to a same antenna port, a subcarrier in which a symbol related to the first type data symbol is located is nearer to a subcarrier in which a reference signal at the same antenna port is located; and
a transmission processing module, to perform an inverse fast fourier transform and a cyclic prefix insertion processing on symbols mapped to subcarriers and then mapping the time domain symbols to a physical antenna for transmission.

14. The base station according to claim 13, wherein, for a 4-antenna system, when the current slot is slot 1, the first antenna pairing mode is: antenna port 0 and antenna port 3 are a pair, and antenna port 1 and antenna port 2 are a pair; and when the current slot is slot 2, the first antenna pairing mode is: antenna port 0 and antenna port 2 are a pair, and antenna port 1 and antenna port 3 are a pair.

15. The base station according to claim 13, wherein,
for an 8-antenna system, when the current slot is slot 1, the first antenna pairing mode is: antenna port 0 and antenna port 3 are a pair, antenna port 1 and antenna port 2 are a pair, antenna port 4 and antenna port 7 are a pair and antenna port 5 and antenna port 6 are a pair;
and when the current slot is slot 2, the first antenna pairing mode is: antenna port 0 and antenna port 2 are a pair, antenna port 1 and antenna port 3 are a pair, antenna port 4 and antenna port 6 are a pair and antenna port 5 and antenna port 7 are a pair.

16. The base station according to claim 13, further comprising:
a second mapping processing module, for performing, for Orthogonal Frequency Division Multiplex symbols not including the reference signal in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which the reference signal at corresponding antenna ports are located is minimum.

17. The base station according to claim 14, further comprising:
a second mapping processing module, for performing, for Orthogonal Frequency Division Multiplex symbols not including the reference signal in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which the reference signal at corresponding antenna ports are located is minimum.

18. The base station according to claim 15, further comprising:
a second mapping processing module, for performing, for Orthogonal Frequency Division Multiplex symbols not including the reference signal in the current slot, the antenna port and subcarrier mapping on the symbols in the transmit diversity matrix according to the first antenna port pairing mode, wherein after the antenna port and subcarrier mapping is performed on the symbols in the transmit diversity matrix according to the first antenna port pairing mode, a sum of frequency domain distances from subcarriers in which symbols related to the first type data symbol are located to subcarriers in which the reference signal at corresponding antenna ports are located is minimum.

19. The base station according to claim 16, wherein in the second mapping processing module, the sum of frequency domain distances from subcarriers in which symbols related to the first type data symbol are located to subcarriers in which the reference signal at corresponding antenna ports are located is made minimum by adjusting a sequence of space frequency block code blocks in the transmit diversity matrix corresponding to the data symbol groups or by adjusting a sequence of symbols in a same space frequency block code block.

20. The base station according to claim 17, wherein in the second mapping processing module, the sum of frequency domain distances from subcarriers in which symbols related to the first type data symbol are located to subcarriers in which the reference signal at corresponding antenna ports are located is made minimum by adjusting a sequence of space frequency block code blocks in the transmit diversity matrix corresponding to the data symbol groups or by adjusting a sequence of symbols in a same space frequency block code block.

21. The base station according to claim 18, wherein in the second mapping processing module, the sum of frequency domain distances from subcarriers in which symbols related to the first type data symbol are located to subcarriers in which the reference signal at corresponding antenna ports are located is made minimum by adjusting a sequence of space frequency block code blocks in the transmit diversity matrix corresponding to the data symbol groups or by adjusting a sequence of symbols in a same space frequency block code block.

22. The base station according to claim 13, wherein the first type data symbol and the second type data symbol are a systematic symbol and a parity symbol respectively.

23. The base station according to claim 14, wherein the first type data symbol and the second type data symbol are a systematic symbol and a parity symbol respectively.

24. The base station according to claim 15, wherein the first type data symbol and the second type data symbol are a systematic symbol and a parity symbol respectively.

* * * * *